United States Patent
Coudron

(10) Patent No.: US 11,198,477 B2
(45) Date of Patent: Dec. 14, 2021

(54) OPENING PANEL MADE FROM PLASTIC, WHICH CONTINUES TO BLOCK THE OPENING IN THE BODY SHELL IN THE EVENT OF AN IMPACT

(71) Applicant: Compagnie Plastic Omnium, Lyons (FR)

(72) Inventor: Philippe Coudron, Caluire et Cuire (FR)

(73) Assignee: Compagnie Plastic Omnium, Lyons (FR)

( * ) Notice: Subject to any disclaimer, the term of this patent is extended or adjusted under 35 U.S.C. 154(b) by 361 days.

(21) Appl. No.: 16/311,855

(22) PCT Filed: Jun. 19, 2017

(86) PCT No.: PCT/FR2017/051596
§ 371 (c)(1),
(2) Date: Dec. 20, 2018

(87) PCT Pub. No.: WO2017/220903
PCT Pub. Date: Dec. 28, 2017

(65) Prior Publication Data
US 2019/0375465 A1    Dec. 12, 2019

Related U.S. Application Data

(60) Provisional application No. 62/352,317, filed on Jun. 20, 2016.

(51) Int. Cl.
B62D 29/04    (2006.01)
B60J 5/10    (2006.01)
(Continued)

(52) U.S. Cl.
CPC ............ B62D 29/043 (2013.01); B60J 5/107 (2013.01); B62D 27/026 (2013.01); B62D 27/06 (2013.01);
(Continued)

(58) Field of Classification Search
CPC .... B62D 29/043; B62D 27/06; B62D 27/026; B62D 27/065; B60J 5/107; B29C 66/712;
(Continued)

(56) References Cited

U.S. PATENT DOCUMENTS

2006/0131926 A1*   6/2006   Virelizier ............... B29C 66/71
                                                              296/146.1
2010/0000156 A1    1/2010   Salhoff
2012/0272580 A1    11/2012  Iwano et al.

FOREIGN PATENT DOCUMENTS

CN    101500835 A    8/2009
CN    102365185 A    2/2012
(Continued)

OTHER PUBLICATIONS

International Search Report PCT/ISA/210 for International Application No. PCT/FR2017/051596 dated Oct. 9, 2017.
(Continued)

*Primary Examiner* — D Glenn Dayoan
*Assistant Examiner* — Melissa Ann Bonifazi
(74) *Attorney, Agent, or Firm* — Harness, Dickey & Pierce, P.L.C.

(57) ABSTRACT

Motor vehicle sub-assembly (10) comprising a first part (20) made of plastic material forming an outer bodywork skin, and a second part (30) made of plastic material forming an internal structure to which said first part (20) is attached, characterised in that the second part (30) comprises at least one mechanical reinforcement (40) made of thermoplastic material having a Young's modulus less than that of the (Continued)

plastic material of the second part (30), and a coefficient of elongation at break greater than that of the plastic material of the second part (30).

19 Claims, 3 Drawing Sheets

(51) Int. Cl.
    *B62D 27/02*     (2006.01)
    *B62D 27/06*     (2006.01)
    *B29C 65/00*     (2006.01)
    *B29K 309/08*     (2006.01)
    *B29K 509/02*     (2006.01)
    *B29K 623/00*     (2006.01)
    *B29L 31/30*     (2006.01)

(52) U.S. Cl.
    CPC ............ *B62D 27/065* (2013.01); *B29C 66/712* (2013.01); *B29C 66/721* (2013.01); *B29K 2309/08* (2013.01); *B29K 2509/02* (2013.01); *B29K 2623/12* (2013.01); *B29L 2031/30* (2013.01)

(58) Field of Classification Search
    CPC ............ B29C 66/721; B29K 2609/08; B29K 2509/02; B29K 2623/12; B29L 2031/30
    See application file for complete search history.

(56) References Cited

FOREIGN PATENT DOCUMENTS

| | | |
|---|---|---|
| EP | 2 7650 16 A1 | 8/2014 |
| FR | 2876621 A1 | 6/2006 |
| FR | 3002759 A1 | 9/2014 |
| JP | H 04116138 A | 4/1992 |
| JP | 2008-037294 A | 2/2008 |
| JP | 2010-100226 A | 5/2010 |
| JP | 2010-188792 A | 9/2010 |
| JP | 4771262 B2 | 9/2011 |
| JP | 2013-082235 A | 5/2013 |
| WO | WO-2010/071214 A1 | 6/2010 |
| WO | WO-2011/063538 A1 | 6/2011 |
| WO | WO-2015/033076 A1 | 3/2015 |

OTHER PUBLICATIONS

Written Opinion of the International Searching Authority PCT/ISA/237 for International Application No. PCT/FR2017/051596 dated Oct. 9, 2017.

Japanese Office Action dated Apr. 6, 2021 for Japanese Application No. 2018-566434.

\* cited by examiner

OPENING PANEL MADE FROM PLASTIC, WHICH CONTINUES TO BLOCK THE OPENING IN THE BODY SHELL IN THE EVENT OF AN IMPACT

CROSS-REFERENCE TO RELATED APPLICATIONS

This application is a national phase under 35 U.S.C. § 371 of PCT International Application No. PCT/FR2017/051596 which has an International filing date of Jun. 19, 2017, which claims priority to U.S. Provisional Application No. 62/352,317, filed Jun. 20, 2016, the entire contents of each of which are hereby incorporated by reference.

The invention relates to the field of the automotive industry. More particularly, the invention relates to a motor vehicle sub-assembly made of plastic material, such as a tailgate, adapted to the safety requirements during an accident affecting the opening panel.

A motor vehicle tailgate comprises an opening panel body, forming an element used to block at least partially an opening in the body shell. The body can be moved between a position blocking the opening and a position allowing free access to the opening.

Rear vehicle opening panels are known in particular, such as tailgates, composed of two main parts: an inner box and an outer skin. These parts form a one- or two-piece panel, incorporating all or some of the outer equipment visible or not from outside the vehicle (light unit, tailgate or rear window opening control, emblem, wash-wipe system, lock, stops, registration plate, etc.).

Most tailgates in the state of the art are made of steel. Tailgates made of thermoplastic and/or thermosetting plastic material are also known, however, so as to lighten the tailgate while offering different mechanical performance.

The thermosetting material provides better resistance to deformation than the thermoplastic material, but has the disadvantage of being more dense. The thermoplastic material generally used has a low elastic limit (start of plastic deformation at low stress) and therefore a relatively low breaking strength and may suffer from mechanical fatigue during use. However, like all vehicle opening panels, opening panels made of thermoplastic material must comply with standards.

To meet the general requirements of the specifications, the zones in particular used to attach the opening panel to the vehicle (hinges, lock, gas springs, etc.) must be reinforced so that the opening panel does not separate from the vehicle during an accident.

To meet other requirements, in case of high speed impact (>20 km/h) suffered by the vehicle, the opening panel, even broken, must also remain in a single entity, to avoid spreading numerous pieces of debris, and continue to exert a certain additional stress. In other words, the opening panel must not break up, fall apart to the point of producing pieces completely detached from the initial assembly or not connected together.

The parts forming the opening panel must therefore accept large deformations without breaking. However, the parts forming the opening panel must at the same time be rigid enough to guarantee the geometrical strength of the opening panel during normal use. Consequently, when plastic materials are used to manufacture an opening panel, the design will specify the use of rigid plastic materials, at least for the inner box (internal structure). However, these materials stretch very little in case of high speed impact.

To provide this stretching property, it is known to add to the opening panel a complementary part, other than the inner box and the outer skin, which may be made of steel or, more generally, for a plastic opening panel, of a glass, carbon or aramid fibre-based textile. This complementary part, carefully positioned on the sensitive zones of the tailgate, holds together the elements broken during the impact.

If the complementary part is made of steel, the cost and weight may soon become incompatible with the interest of using a plastic material to manufacture a lightened opening panel.

If a woven (textile) reinforcement is used, the broken pieces will be held together.

To hold together the elements broken during an impact, it also known to use cables, or reinforcement fibre braids added or overmoulded onto the lining of the opening panel. This type of complementary part (braid, cable) is generally assembled with play on the lining and not "tight/adjusted/stretched". Consequently, when parts of the opening panel are broken, they are simply held together so that they do not fall onto the road but remain "separated" (5 to 10 cm) from each other due to the play left by the complementary part. These pieces are therefore "almost free" due to the flexibility of the complementary part.

However, to meet other requirements of standards, or of car manufacturers, it is also necessary that in case of high speed impact (>20 km/h) suffered by the opening panel, the opening panel, even broken, must continue to block at least partially the opening in the body shell, to avoid ejecting outside the passenger compartment a passenger or an object inside the vehicle.

To do this, the assembly composed of the broken pieces held together must retain sufficient rigidity, in other words this broken up assembly composed of pieces held together must retain the possibility of forming a physical obstacle strong enough to continue to block the opening.

However, if a textile, braid or cable is used, the assembly composed of broken pieces held together does not form an assembly that is rigid enough to block the opening in the body shell to avoid ejecting a passenger or an object inside the vehicle since these connection materials have an extremely low Young's modulus.

Thus, there is currently no opening panel made of plastic material that simultaneously complies with the following requirements during a high speed impact:
  the opening panel does not separate from the vehicle;
  the broken elements of the opening panel remain held together as a single entity;
  the opening panel continues, at least partially, to block the opening in the body shell.

The invention aims to remedy these disadvantages by providing a motor vehicle sub-assembly comprising a first part forming an outer bodywork skin and a second part forming an internal structure (lining) to which said skin is attached. The second part forming an internal structure comprises at least one mechanical reinforcement made of thermoplastic material having a Young's modulus less than that of the plastic material of the internal structure, and a coefficient of elongation at break greater than that of the plastic material of the internal structure.

Such a motor vehicle sub-assembly preserves the integrity of the internal structure after an impact, while retaining a satisfactory mass balance and a relevant financial balance.

The sub-assembly may further comprise one or more of the following characteristics, taken alone or in combination:
  the first part is made of thermoplastic material and the second part is made of thermosetting plastic material;

the mechanical reinforcement has the following properties:
  a Young's modulus of between 500 MPa and 3000 MPa, preferably between 800 MPa and 2000 MPa;
  a coefficient of elongation at break greater than 20%, preferably between 20% and 80%, and more preferably greater than 80%;
the mechanical reinforcement is made of polypropylene (PP), or polyethylene (PE);
the mechanical reinforcement is arranged in at least one rupture zone identified in case of impact on the sub-assembly;
the sub-assembly comprises a single mechanical reinforcement covering all the rupture zones identified in case of impact on the sub-assembly;
the sub-assembly forms a tailgate and the mechanical reinforcement comprises an element forming a loop, said element being attached to the lock zone, so that the lock is positioned inside the loop when the tailgate is closed;
the rupture zones consist of any zone where a break is observed during a real or simulated high speed impact test on the second part;
the sub-assembly forms a tailgate and the rupture zones are selected from the following zones:
  the two lateral bottom corners of the tailgate;
  the zone connecting the tailgate upright to the tailgate base;
  the two zones perpendicular to the base of the internal structure, and surrounding the lock zone;
the mechanical reinforcement is attached to the second part using at least one of the following techniques: bonding, welding (ultrasound, laser, mirror, etc.), staking, overmoulding, screwing, riveting, clipping, gluing;
the first part is made of thermoplastic material comprising polypropylene and 30% by weight of talc;
the second part is made of thermoplastic material comprising polypropylene and 40% by weight of long glass fibres;
the second part is made of thermosetting plastic material such as SMC comprising 30% by weight of long reinforcement fibres;
the mechanical reinforcement comprises at least two sub-portions;
each sub-portion comprises an element forming a loop, said element being attached to the lock zone, so that the lock is positioned inside the loop when the tailgate is closed;
the mechanical reinforcement has a generally double "U" shape;
each "U" zone of the mechanical reinforcement is completed by a generally horizontal "Y" shape.

The invention will be better understood on reading the accompanying figures, which are given solely by way of example and not limiting in any way, in which.

Figure 1:
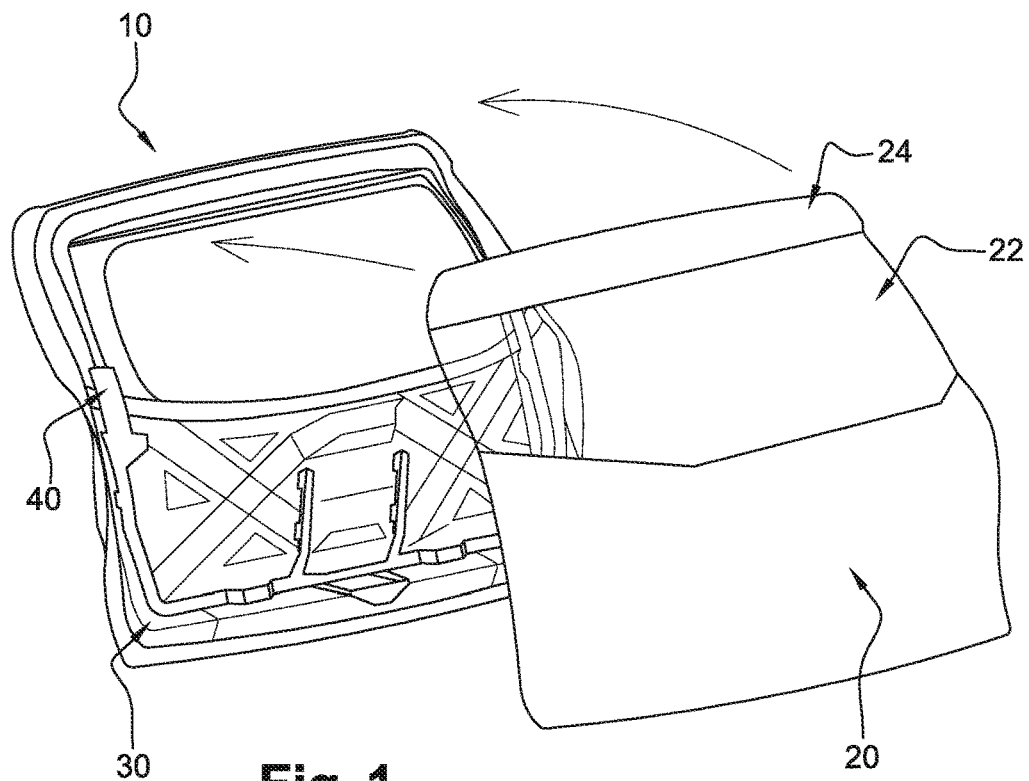
FIG. 1 illustrates a motor vehicle tailgate comprising a first part forming an outer bodywork skin and a second part forming an internal structure to which the skin is attached.

We now refer to FIG. 1, which illustrates a motor vehicle sub-assembly (10) comprising a first outer bodywork skin (20) carrying for example a window 22 and a spoiler 24, and a second part forming an internal structure (30) (lining) to which said skin (20) is attached.

The outer skin (20) and the internal structure (30) are made of plastic material. According to a preferred embodiment, the outer skin (20) is made of thermoplastic material, and the internal structure (30) is made of thermosetting plastic material.

The second part forming an internal structure (30) comprises at least one mechanical reinforcement (40) made of thermoplastic material having a Young's modulus less than that of the plastic material of the internal structure (30), and a coefficient of elongation at break greater than that of the plastic material of the internal structure (30).

Preferably, the mechanical reinforcement (40) has a low density, less than that of the plastic material of the internal structure (30). Thus, the density of the mechanical reinforcement (40) is preferably less than 1.0 kg/L.

Figure 3:
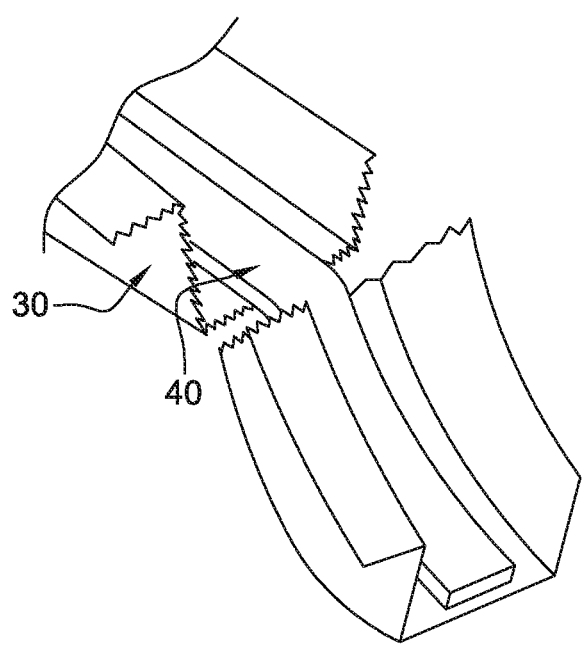
FIG. 3 illustrates a detail of FIG. 2 after a high speed impact; this figure illustrates locally the behaviour of the mechanical reinforcement to hold together on either side of a rupture line the two broken pieces of a second part while retaining sufficient rigidity to block the opening in the body shell.

As illustrated on FIG. 3, such a mechanical reinforcement (40) retains the rigidity required for the internal structure (30) during normal use, while allowing large deformations without breaking in case of high speed impact (>20 km/h), and holding together the broken elements of the internal structure (30).

Lastly, such a mechanical reinforcement (40) acts as a wall closing the rear opening and preventing objects and/or passengers from being ejected outside the vehicle in case of high speed impact.

During a high speed impact, in fact, the internal structure (30) will break in different places. The mechanical reinforcement (40) will then bend on either side of the lining rupture zone, but without breaking due to its high coefficient of elongation, thus retaining a continuous link between the broken parts and in particular retaining sufficient rigidity of the internal structure (30), thus formed from the broken parts held together, to avoid ejecting a passenger. Sufficient rigidity corresponds to a requirement for a given zone, of given area, to exhibit a displacement less than a threshold value under the effect of a given force. These values are generally provided by the car manufacturer.

We now describe an embodiment wherein the sub-assembly (10) is a motor vehicle opening panel (10), and more precisely a tailgate type opening panel, as illustrated on FIG. 1.

Type of the Mechanical Reinforcement (40)

A mechanical reinforcement made of a thermoplastic material having the following properties can be used:
  a Young's modulus of between 500 MPa and 3000 MPa, preferably between 800 MPa and 2000 MPa;
  a very high coefficient of elongation at break, in other words greater than 20%, preferably between 20% and 80%, and more preferably greater than 80%.

The "coefficient of elongation at break" means the ratio of the length of a standardised specimen before break when subjected to a tensile force using a tensile testing machine exerting a longitudinal force at the ends of the specimen, to the length of the standardised specimen, before any tensile force is applied. The coefficient of elongation at break is expressed as a percentage.

For example, at least one of the following materials can be used alone or in combination:
polypropylene material (PP);
polyethylene material (PE).

Dimensions of the Mechanical Reinforcement (40)

The mechanical reinforcement (40) may have any geometry.

However, its shape and dimensions including the thickness can be defined in order to increase, or improve, its flexibility and/or its stiffness and/or its weight.

According to an embodiment (see FIG. 2), for a motor vehicle tailgate, the reinforcements (40) used have the following geometry:
U cross-section of 30 mm (base of the U)×15 mm (side of the U);
3 mm thickness;

Obviously, however, those skilled in the art will be able to adapt the cross-section (to I for example), dimensions, thickness and weight according to the requirements observed during real or simulated high speed impact tests.

Position of the Mechanical Reinforcement (40)

The opening panel (10) may comprise several mechanical reinforcements (40) connected to the internal structure (30). Each reinforcement (40) is arranged in at least one rupture zone (50) identified in case of impact on the opening panel (10). Such a zone may be identified by those skilled in the art during real or simulated high speed impact tests.

Since the tailgate is attached to the body, even during an impact, by three points designed accordingly (the lock zone and the two hinge zones), the rupture zones (50A) are in particular the two lateral bottom corners of the tailgate (see FIG. 2), which are the zones of lowest mechanical strength.

These zones (50A) are in fact far away from the three anchor points and may therefore "flap" if the tailgate breaks at the bottom of the upright (bottom corner of the window).

Figure 2:
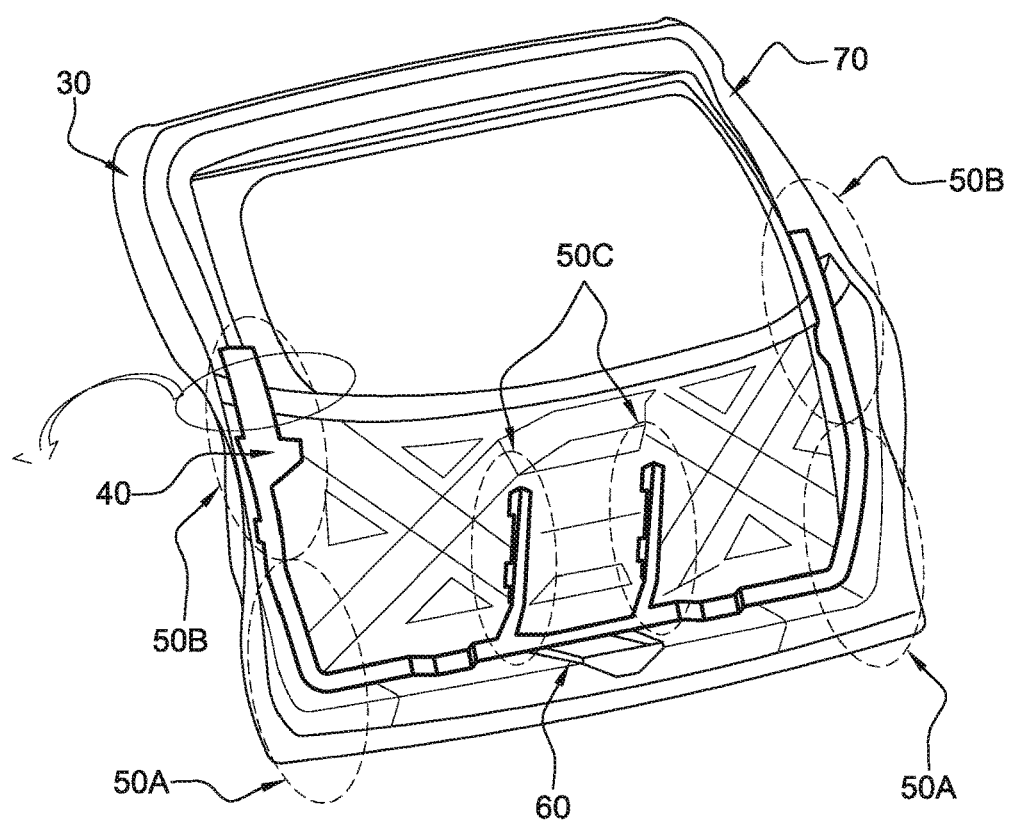
FIG. 2 illustrates a second part forming an internal structure comprising mechanical reinforcements in potential rupture zones.

As illustrated on FIG. 2, the rupture zones (50) may also be:
the zone (50B) connecting the lateral upright (70) to the tailgate base (part of the structure opposite the bottom corner of the window);
the two zones perpendicular to the base of the internal structure (50C), and surrounding the lock zone;
and generally, any zone where a break is observed during a real or simulated high speed impact test on the internal structure (30).

According to a particular embodiment, illustrated by FIG. 2, a single one-piece mechanical reinforcement (40) is used to cover and continuously join the various zones (50). The reinforcement may therefore take the shape of a tape.

More generally, the reinforcement cross-section may vary depending on the mechanical design, the three-dimensional profile of the internal structure (30) to be followed, the space available, the weight and attachment method constraint. Thus, the reinforcement may have U, I, H, L, W cross-sections, etc.

According to a particular example of this embodiment, the continuous mechanical reinforcement (40), covering all the zones (50) comprises an element forming a loop (60). This element (60) is attached to the lock zone, so that the lock is positioned inside the loop (60) when the tailgate is closed. Thus, during a high speed impact, since the lock zone is designed and reinforced (for example by a steel insert) not to break, the entire reinforcement (40) remains attached to the loop. The loop (60) thus forms, with the lock, an anchor point for the one-piece reinforcement (40).

According to another embodiment (FIG. 4), the mechanical reinforcement (40) is not one-piece, but comprises at least two sub-portions (42, 44). The sub-portions are two separate entities, which may optionally be placed in contact during assembly on the tailgate. A priori therefore, they are not obtained from a single moulding operation or from the same mould cavity. Each sub-portion is therefore generally manufactured independently of the other. For example, the mechanical reinforcement (40) comprises a first sub-portion (44) located on the right side of the vehicle, and a second sub-portion (42) located on the left side of the vehicle.

In this configuration, and according to a first embodiment, each sub-portion (42, 44) comprises an element forming a loop (60). Each element (60) is attached to the lock zone, so that the lock is positioned inside the loops (60) when the tailgate is closed. The loops (60) thus form, with the lock, an anchor point for the sub-portions of the reinforcement (40).

In this configuration, and according to a second embodiment, each sub-portion (42, 44) comprises an element forming a loop (60) but each element (60) is attached to an anchor point, that is separate for each sub-portion or common. Preferably, this or these anchor points are located near the Y0 plane of the vehicle (the Y0 plane is the longitudinal plane of the vehicle separating the right side and the left side of the vehicle). The common anchor point can be a screw attaching the lock or a lock reinforcement tab. The two sub-portions (42, 44) are not necessarily symmetrical. Separate anchor points can be produced by different screws attaching the lock to the tailgate.

According to one embodiment, the mechanical reinforcement (40) has a generally double "U" shape, a "U" shape on the right side, and a "U" shape on the left side of the vehicle, as illustrated on FIG. 2 for example. If the mechanical reinforcement (40) comprises several sub-portions, then each sub-portion has a generally "U" shape. This configuration with several sub-portions allows the parts to be manufactured using smaller moulds and simplifies the storage and the handling operations during assembly.

Figure 5:
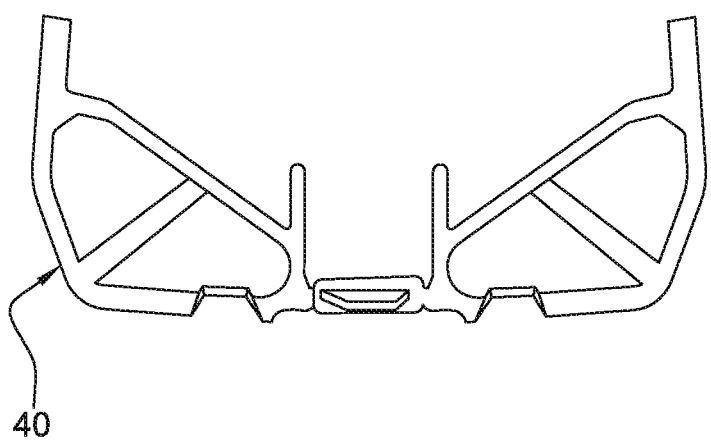
FIG. 5 illustrates a mechanical reinforcement in which each "U" zone is completed by a generally horizontal "Y" shape.

According to another embodiment, illustrated on FIG. 5, each "U" zone of the mechanical reinforcement (40) is completed by a generally horizontal "Y" shape. This "Y" shaped reinforcement complement is a functional complement from the mechanical point of view. It is located inside each "U", the branches of the "Y" connect those of the "U", and preferably connect the ends of the branches of the "U". These diagonal connections, provided by the branches of the "Y", connect together the branches of the "U" by a triangulation effect, and therefore prevent them from separating when the opening panel breaks up.

Figure 4:
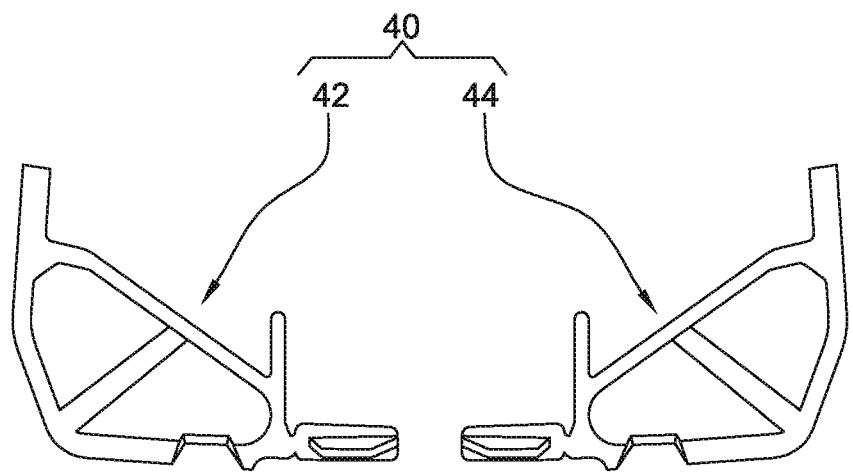
FIG. 4 illustrates a non one-piece mechanical reinforcement, comprising two sub-portions, a first sub-portion located on the right side of the vehicle, and a second sub-portion located on the left side of the vehicle.

If the mechanical reinforcement (40) consists of several sub-portions (42, 44), then each sub-portion has a generally "Y" shape combined with a "U" shape (see FIG. 4).

The branches of the "U" and the branches of the "Y" are obtained by moulding, preferably at the same time: the branches of the "U" and of the "Y" form a single piece. According to another embodiment, however, the branches of the "Y" may also be obtained separately from the branches of the "U". In this case, the branches forming the "Y" are connected to the "U" by any attachment means, such as bonding, riveting, welding, etc.

Attachment of the Mechanical Reinforcement (40)

Each mechanical reinforcement (40) is attached to the internal structure (30) using at least one of the following techniques: bonding, welding (ultrasound, vibration, laser, mirror, etc.), staking, overmoulding, screwing, riveting, clipping, gluing, etc.

EMBODIMENT EXAMPLES

According to a particular embodiment, the internal structure (30) is made of thermoplastic material comprising PP and 40% by weight of long glass fibres. A long fibre generally has a virgin length (before implementation) greater than 10 mm. Such a material has a Young's modulus substantially equal to 5300 MPa, a coefficient of elongation at break of 3.5%, and a density of 1.22 kg/L.

The reinforcement fibres may also be glass, carbon, aramid, kevlar fibres, etc.

According to another particular embodiment, the internal structure (30) is made of thermosetting plastic material such as SMC comprising 30% (by weight) of long reinforcement fibres. Such a material has a Young's modulus substantially equal to 11000 MPa, a coefficient of elongation at break of 1.5%, and a density of 1.9 kg/L.

According to a particular embodiment, the outer skin (20) is made of thermoplastic material comprising PP and 30% by weight of talc. Such a material has a Young's modulus substantially equal to 3000 MPa, a coefficient of elongation at break of 17%, and a density of 1.12 kg/L.

According to a particular embodiment, the mechanical reinforcement (40) is made of a polypropylene-based thermoplastic material with no filler (no glass fibre or talc). For example, the PP Compound 108 CSF10 manufactured by SABIC® has a Young's modulus substantially equal to 1300 MPa, a coefficient of elongation at break of 500%, and a density of 0.96 kg/L.

The invention is not limited to the embodiments described and other embodiments will be clearly apparent to those skilled in the art. In particular, the mechanical reinforcement (40) can be made of steel.

We have described a sub-assembly (10) forming a tailgate type opening panel. However, we would not leave the scope of the invention if the sub-assembly was another type of opening panel, or all structural or semi-structural parts, subject to the same type of stress during a high speed impact.

The invention claimed is:

1. A motor vehicle sub-assembly comprising:
a first part made of plastic material forming an outer bodywork skin; and
a second part made of plastic material forming an internal structure to which said first part is attached, the second part including at least one mechanical reinforcement made of thermoplastic material having a Young's modulus less than that of the plastic material of the second part, and a coefficient of elongation at break greater than that of the plastic material of the second part such that the at least one mechanical reinforcement is configured to maintain a rigidity of the second part during normal use while allow deformation without breaking in response to a high speed impact to the motor vehicle sub-assembly.

2. The motor vehicle sub-assembly according to claim 1, wherein the first part is made of thermoplastic material and the second part is made of thermosetting plastic material.

3. The motor vehicle sub-assembly according to claim 1, wherein the mechanical reinforcement has the following properties:
a Young's modulus of between 500 MPa and 3000 MPa, preferably between 800 MPa and 2000 MPa, and
a coefficient of elongation at break greater than 20%, preferably between 20% and 80%, and more preferably greater than 80%.

4. The motor vehicle sub-assembly according to claim 1, wherein the mechanical reinforcement is made of polypropylene, or polyethylene.

5. The motor vehicle sub-assembly according to claim 1, wherein the mechanical reinforcement is arranged in at least one rupture zone identified in case of impact on the sub-assembly.

6. The motor vehicle sub-assembly according to claim 1, wherein the mechanical reinforcement is included in the second part as a single mechanical reinforcement covering all rupture zones identified in case of impact on the sub-assembly.

7. The motor vehicle sub-assembly according to claim 6, wherein the motor vehicle sub-assembly forms a tailgate and the mechanical reinforcement comprises:
an element forming a loop, said element being attached to a lock of the tailgate such, that the lock is positioned inside the loop when the tailgate is closed.

8. The motor vehicle sub-assembly according to claim 5, wherein the at last one rupture zone is a portion of the motor vehicle sub-assembly where a break is observed during a real or simulated high speed impact test on the second part.

9. The motor vehicle sub-assembly according to claim 5, wherein the motor vehicle sub-assembly forms a tailgate and wherein the at last one rupture zone is selected from the following zones:
two lateral bottom corners of the tailgate;
a zone connecting the tailgate upright to the tailgate base; or
two zones perpendicular to the base of the internal structure, and surrounding a lock of the tailgate.

10. The motor vehicle sub-assembly according to claim 1, wherein the mechanical reinforcement is attached to the second part using at least one of the following techniques: bonding, welding, staking, overmoulding, screwing, riveting, clipping, or gluing.

11. The motor vehicle sub-assembly according to claim 1, wherein the first part is made of thermoplastic material comprising polypropylene and 30% by weight of talc.

12. The motor vehicle sub-assembly according to claim 1, wherein the second part is made of thermoplastic material comprising polypropylene and 40% by weight of long glass fibres.

13. The motor vehicle sub-assembly according to claim 1, wherein the second part is made of Sheet Molding Compound (SMC) comprising 30% by weight of long reinforcement fibres.

14. The motor vehicle sub-assembly according to claim 1, wherein the mechanical reinforcement comprises at least two sub-portions.

15. The motor vehicle sub-assembly according to claim 14, wherein the motor vehicle sub-assembly forms a tailgate and each sub-portion comprises an element forming a loop, said element being attached to a lock of the tailgate such, that the lock is positioned inside the loop when the tailgate is closed.

16. The motor vehicle sub-assembly according to claim 1, wherein the mechanical reinforcement has a generally double "U" shape.

17. The motor vehicle sub-assembly according to claim 16, wherein each "U" zone of the mechanical reinforcement is completed by a generally horizontal "Y" shape.

18. A motor vehicle sub-assembly comprising:
a first part made of plastic material forming an outer bodywork skin; and
a second part made of plastic material forming an internal structure to which said first part is attached, the second part including at least one mechanical reinforcement made of thermoplastic material having a Young's modulus less than that of the plastic material of the second part, and a coefficient of elongation at break greater than that of the plastic material of the second part, wherein the mechanical reinforcement is included in the second part as a single mechanical reinforcement covering all rupture zones identified in case of impact on the sub-assembly.

19. A motor vehicle sub-assembly comprising:
a first part made of plastic material forming an outer bodywork skin; and
a second part made of plastic material forming an internal structure to which said first part is attached, the second part including at least one mechanical reinforcement made of thermoplastic material having a Young's modulus less than that of the plastic material of the second part, and a coefficient of elongation at break greater than that of the plastic material of the second part, wherein the motor vehicle sub-assembly forms a tailgate and the mechanical reinforcement includes an element forming a loop, said element being attached to a lock of the tailgate such that the lock is positioned inside the loop when the tailgate is closed.

* * * * *